United States Patent [19]

Mizuno et al.

[11] Patent Number: 5,812,185

[45] Date of Patent: Sep. 22, 1998

[54] MULTIPOINT VIDEO TELECONFERENCING APPARATUS FOR PROCESSING AND COMBINING COMPRESSED IMAGE INFORMATION

[75] Inventors: Hiromi Mizuno; Hideyuki Fukuoka, both of Tokyo, Japan

[73] Assignee: NEC Corporation, Tokyo, Japan

[21] Appl. No.: 394,277

[22] Filed: Feb. 24, 1995

[30] Foreign Application Priority Data

Feb. 24, 1994  [JP]  Japan ................................. 6-025830
Sep. 12, 1994  [JP]  Japan ................................. 6-217474

[51] Int. Cl.[6] .................................................. H04N 7/15
[52] U.S. Cl. .......................................... 348/17; 348/15
[58] Field of Search ............................... ; 348/17–19, 15, 348/16, 387; H04N 7/15, 7/14

[56] References Cited

U.S. PATENT DOCUMENTS 5,408,261  4/1995  Kamata et al. .......................... 348/15

FOREIGN PATENT DOCUMENTS 0032683  2/1986  Japan ............................. H04N 7/14
0203692  8/1990  Japan ............................. H04N 7/15
0156194  5/1992  Japan ............................. H04N 7/14

OTHER PUBLICATIONS

Sabri et al., "Video Conferencing Systems," Proceedings of the IEEE, vol. 73, No. 4, Apr., 1985, New York, pp. 671–688.

Tanigawa et al., "Personal Mulitmedia–Multipoint Teleconference System," IEEE Infocom'91–Proceedings vol. 3, Apr. 7–11, 1991, Bal Harbor, Florida, pp. 1127–1144.

Addeo et al., "A Multi–Media Multi–Point Communication Services Capability for Broadband Networks," International Switching Symposium 1987—Innovations in Switching Technology, Mar. 15–20, 1987, Phoenix, Arizona, pp. 423–428.

Kundig et al., "An Experimental Multimedia Communication System," ICC'93 Geneva—Conference Record, May 23–26, 1993, Geneva, pp. 838–842.

*Primary Examiner*—David E. Harvey
*Attorney, Agent, or Firm*—Sughrue, Mion, Zinn, Macpeak & Seas, PLLC

[57] ABSTRACT

In a video teleconferencing system, line interfaces are connected to communication channels for receiving data-compressed integrated frame format signals from a video teleconferencing apparatus. Each of the integrated frame format signals contains the respective video frames of user terminals. Data decompression decoders are respectively connected to the interfaces for decompressing the data-compressed integrated frame format signals to produce data-decompressed integrated frame format signals. A controller, connected to the interfaces, receives control signals from the channels and produces an address signal. Extraction circuits are respectively connected to the decoders for extracting desired video frames from each of the data-decompressed integrated frame format signals in accordance with the address signal. The output signals of the extraction circuits are integrated by a video integrator and data-compressed by an encoder for transmission via the interface.

16 Claims, 10 Drawing Sheets

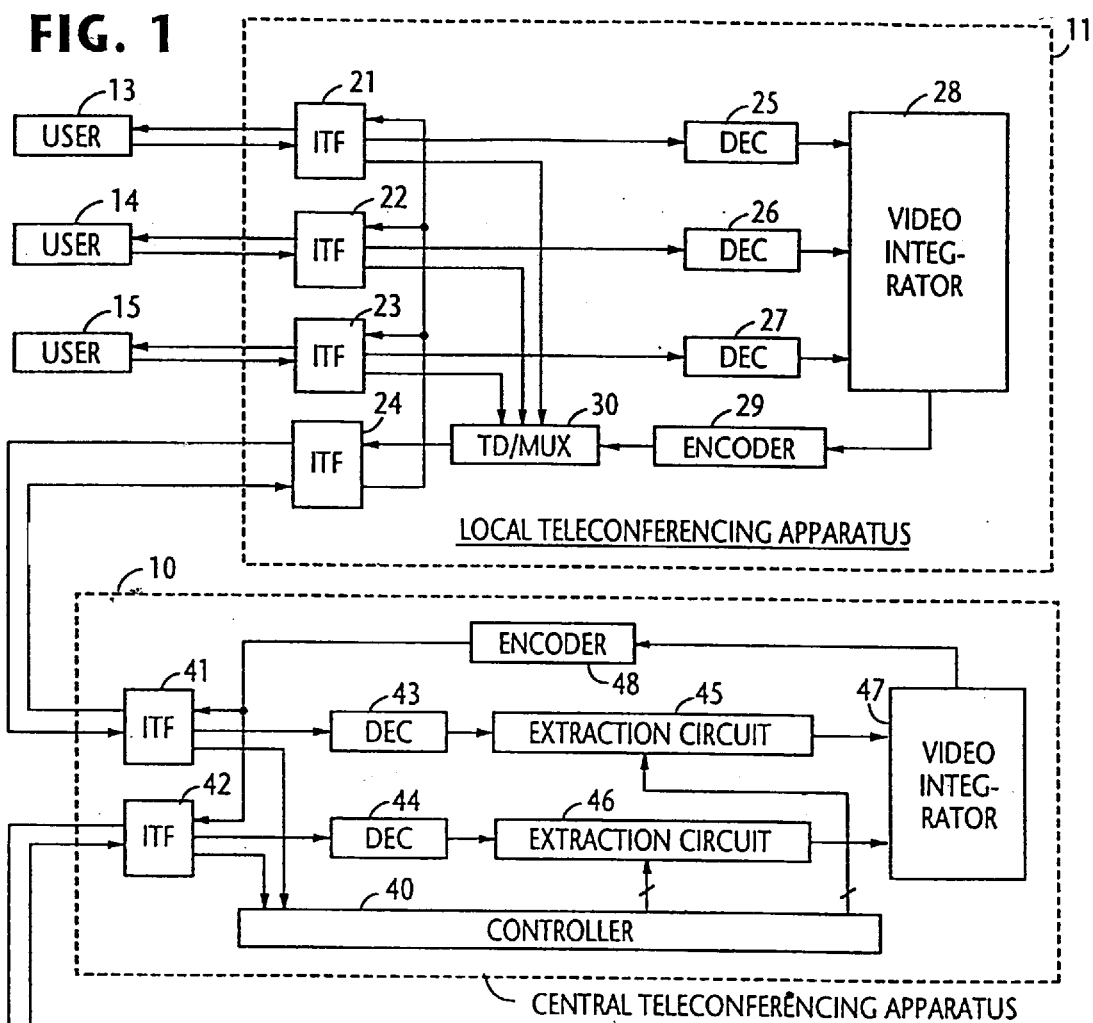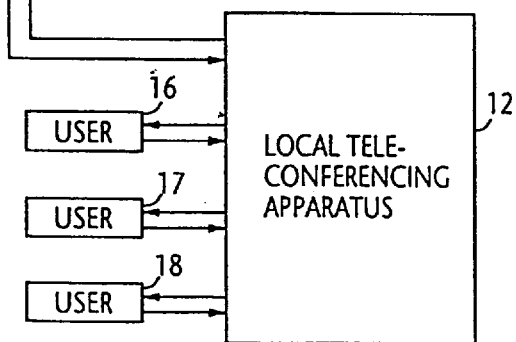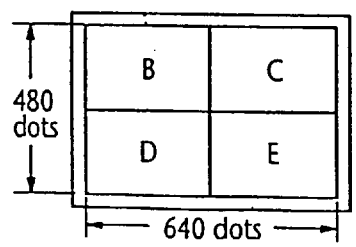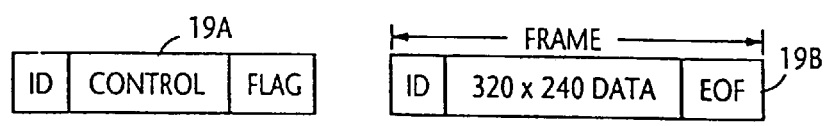

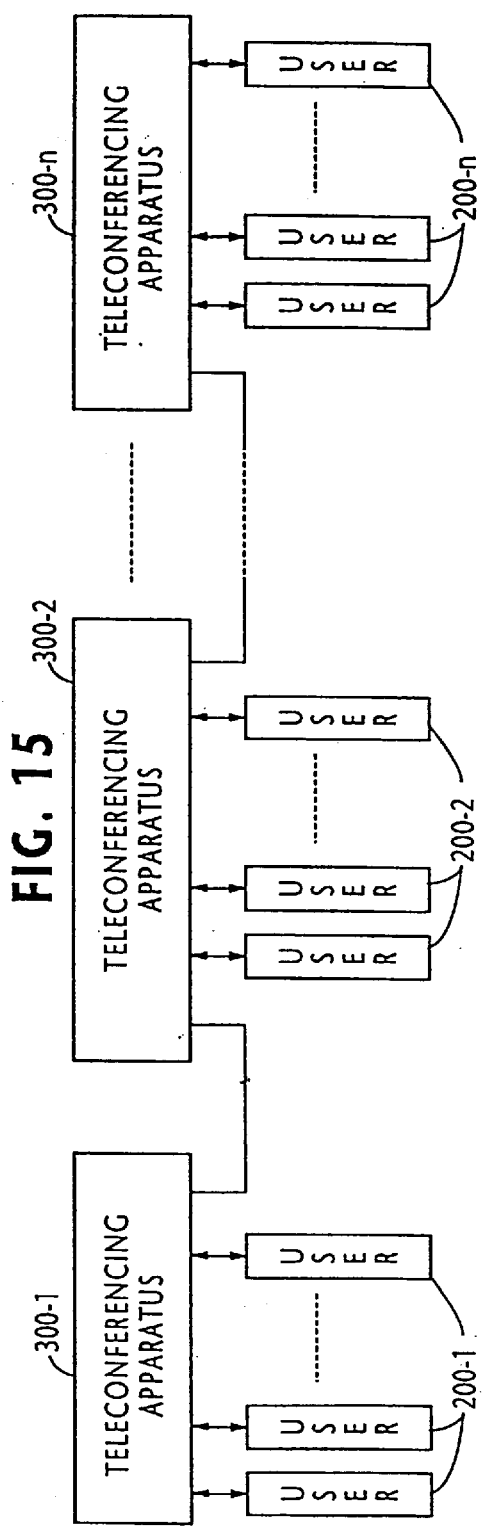
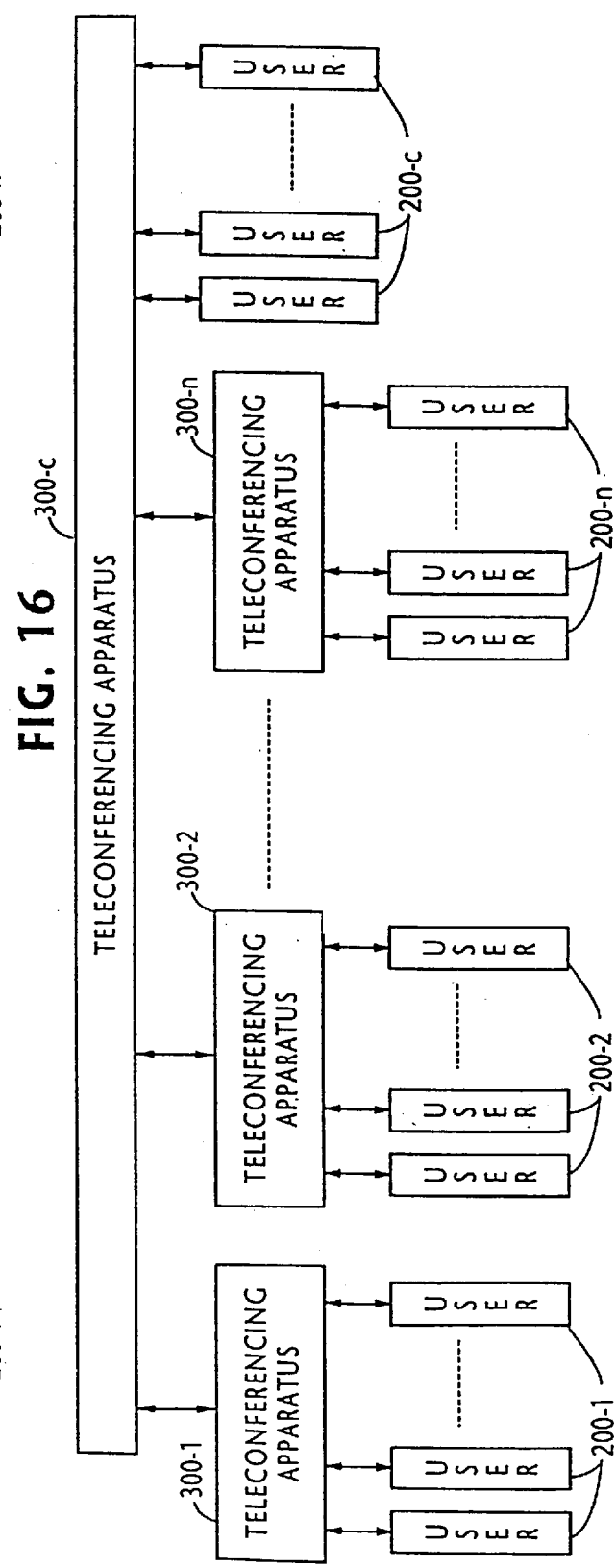

MULTIPOINT VIDEO TELECONFERENCING APPARATUS FOR PROCESSING AND COMBINING COMPRESSED IMAGE INFORMATION

BACKGROUND OF THE INVENTION

1. Field of the Invention

The present invention relates to video communications apparatus, and more specifically to a multipoint video teleconferencing apparatus and a system using it.

2. Description of the Related Art

In a conventional video teleconferencing system, data-compressed video signals from user terminals are received by a video teleconferencing apparatus where they are data-decompressed and integrated into a single frame format by the use of a video multiplexer. The integrated frame format signal is then data-compressed for transmission to the user terminals. However, due to the data compression, the boundary between the individual frame components of an integrated frame format signal is not determinable. Therefore, it is impossible to further provide integration of a data-compressed integrated frame format signal with another data-compressed integrated frame format signal. Although integration of all user signals into a single frame format may be possible by sending user signals to several video teleconferencing apparatus of a network, the cost of communications channels would increase disproportionately with increase in the number of user terminals.

SUMMARY OF THE INVENTION

It is therefore an object of the present invention to provide a video teleconferencing apparatus that allows economic implementation of a network of video teleconferencing apparatus.

Another object of the present invention is provide a video teleconferencing apparatus capable of integrating data-compressed integrated frame format signals.

A further object of the present invention is to provide a video teleconferencing apparatus which allows processing of video signals without data compression and decompression processes.

A further object of the present invention is to provide a video teleconferencing apparatus which allows efficient utilization of communication channels.

According to a first aspect of the present invention, there is provided a video teleconferencing apparatus which comprises a plurality of interfaces connected to communication channels for receiving data-compressed integrated frame format signals, each of the integrated frame format signals containing a plurality of video frames of user terminals. A plurality of data decompression decoders are respectively connected to the interfaces for decompressing the data-compressed integrated frame format signals and producing a plurality of data-decompressed integrated frame format signals. A controller is connected to the interfaces for receiving control signals from the channels and producing therefrom an address signal. A plurality of extraction circuits are respectively connected to the decoders for extracting desired ones of the video signals from each of the data-decompressed integrated frame format signals in accordance with the address signal from the controller. A video integrator is provided for integrating output signals of the extraction circuits and producing an integrated frame format signal. A data compression encoder compresses the integrated frame format signal and coupling the compressed signal to the interface.

According to a second aspect, there is provided a video communication system comprising a plurality of local teleconferencing apparatus respectively associated with groups of user terminals for receiving data-compressed video signals. Each of the local teleconferencing apparatus comprises a plurality of data decompression decoders for decompressing the video signals from the user terminals of the associated group. The output signals of the decoders are integrated by a video integrator to produce an integrated frame format signal, which is data compressed by a data compression encoder and transmitted together with control signals from the user terminals of the associated group to a central teleconferencing apparatus. The central teleconferencing apparatus comprises a plurality of interfaces connected respectively to the local teleconferencing apparatus for receiving the data-compressed integrated frame format signal and the control signals from each local teleconferencing apparatus. A plurality of data decompression decoders are respectively connected to the interfaces for decompressing the data-compressed integrated frame format signals from the respective local teleconferencing apparatus and producing a plurality of data-decompressed integrated frame format signals. A controller is connected to the interfaces for receiving the control signals via the interfaces and producing therefrom an address signal. A plurality of extraction circuits are respectively connected to the decoders for extracting desired ones of the video signals from each of the data-decompressed integrated frame format signals in accordance with the address signal from the controller. A video integrator provides integration of output signals of the extraction circuits to produce an integrated frame format signal. A data compression encoder compresses the integrated frame format signal and transmitting the compressed integrated frame format signal to each of the local teleconferencing apparatus via the interfaces.

According to a third aspect, there is provided a video teleconferencing apparatus comprising a plurality of interfaces respectively connected to communication channels for receiving data-compressed video signals therefrom, each of the video signals containing a full-size frame, a smaller-than-full-size frame, or a multiplex of the full-size and smaller-than-full-size frames. A controller is connected to the interfaces for receiving control signals from the channels and producing therefrom a command signal. A plurality of frame deformatters are connected respectively to the interfaces for decomposing the video signals therefrom into constituent frames. A switch is provided having a plurality of input ports connected respectively to the frame deformatters to receive the decomposed frames therefrom and a plurality of output ports for routing each of the decomposed frames to one of the output ports in accordance with the command signal from the controller. A plurality of frame formatters are connected respectively between the output ports of the switch and the interfaces, each of the frame formatters being responsive to the command signal for converting a plurality of decomposed smaller-than-full-size frames routed thereto via the corresponding output port into a multiframe format signal and converting a decomposed full-size frame routed thereto via the corresponding output port into a single frame format signal, the multiframe format signal and the single frame format signal being supplied to a corresponding one of the interfaces.

According to a fourth aspect, the present invention provides a video communication system comprising a plurality of user terminals and a teleconferencing apparatus. Each of the user terminals comprises a data compression encoder which is responsive to a command signal for producing a first data-compressed video signal having a full-size frame format, a second data-compressed video signal having a smaller-than-full-size frame format, or a multiplex of the first and second data-compressed video signals. A frame formatter converts the output of the data compression encoder into a single frame format signal or a multiframe format signal and forwards the output of the frame formatter to a communication channel. A video signal from-the channel are decomposed by a frame deformatter into constituent frames and data-decompressed by a decoder. If the frames are of full-size frame format, they are directly supplied to a display unit. If the frames are of smaller-than-full-size frame format, they are converted to an integrated frame format before being applied to the display unit. The teleconferencing apparatus comprises a plurality of interfaces respectively connected to the user terminals via respective communication channels for receiving data-compressed video signals therefrom, and a controller connected to the interfaces for receiving control signals from the user terminals for producing therefrom a plurality of command signals and transmitting one of the command signals to the data compression encoder of each user terminal via the corresponding interface. A plurality of frame deformatters are connected respectively to the interfaces for decomposing video signals therefrom into constituent frames. A switch matrix is provided having a plurality of input ports connected respectively to the frame deformatters to receive the decomposed constituent frames, and a plurality of output ports. The switch matrix provides routing of each of the decomposed frames to one of the output ports in accordance with one of the command signals. A plurality of frame formatters are connected respectively between the output ports of the switch matrix and the interfaces. Each frame formatter is responsive to one of the command signals for converting a plurality of decomposed smaller-than-full-size frames routed thereto via the corresponding output port into a multiframe format signal and converting a decomposed full-size frame routed thereto via the corresponding output port into a single frame format signal. The multiframe format signal and the single frame format signal are supplied to a corresponding one of the interfaces.

BRIEF DESCRIPTION OF THE DRAWINGS

The present invention will be described in further detail with reference to the accompanying drawings, in which:

FIG. 1 shows in block diagram form a multipoint video teleconferencing system according to a first embodiment of the present invention;

FIG. 2 shows data structures of data sent from the user terminals;

FIG. 3 shows a typical example of a full-size monitor screen on which quarter-sized frames of four users are displayed;

FIGS. 15 and 16 show an interlinked network configuration and a hierarchical network configuration, respectively, using the teleconferencing apparatus of FIG. 14.

DETAILED DESCRIPTION

Figure 4:
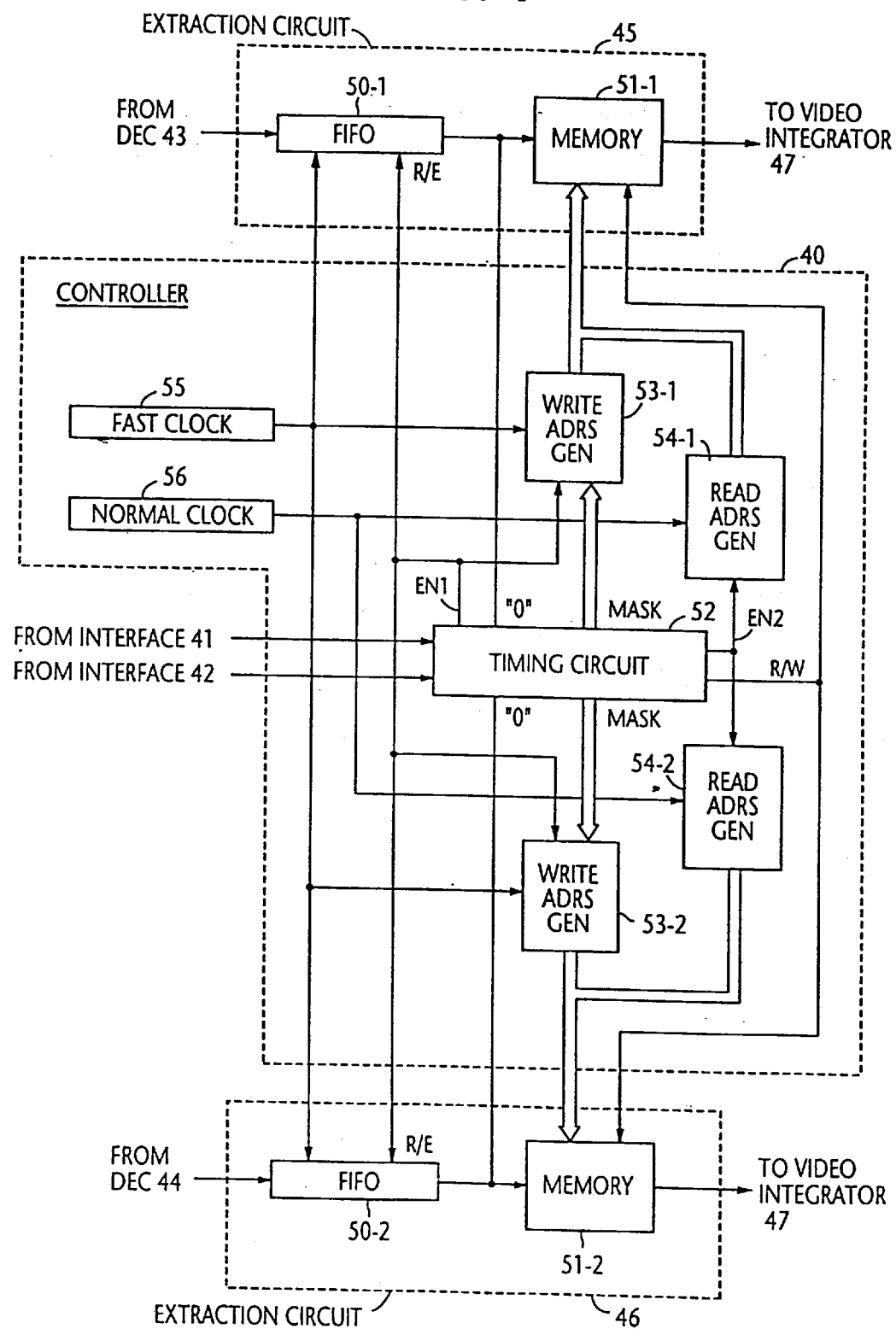
FIG. 4 shows details of the extraction circuits and the controller of FIG. 1.

Referring now to FIG. 1, there is shown a multipoint video teleconferencing system according to a first embodiment of the present invention. The video teleconferencing system includes a central teleconferencing apparatus 10, a plurality of local teleconferencing apparatus 11, 12 of identical structure and a plurality of user video terminals 13 to 18. User video terminals 13, 14 and 15 are connected via two-way communication channels (such as ISDN basic-rate channels) to respective line interfaces 21, 22 and 23 located in the local teleconferencing apparatus 11. Similarly, user video terminals 16 to 18 are connected to the respective line interfaces of the local teleconferencing apparatus 12.

Each user terminal provides data compression on video signals according to the JPEG (joint Photographic Expert Group) standards so that the data-compressed video frame carries an image with a resolution of 320×240 dots (quarter size of full-size scale). From the associated local teleconferencing apparatus, the user terminal receives a data-compressed video signal in a single frame format in which multiple smaller-than-full-size frames are integrated. After the data decompression process, the signal is reproduced on a 640×480-dot (full size) screen four times larger than the size of each original image. As illustrated in FIG. 2, one of the user terminals has the right to send a control packet 19A which includes the source user's identifier field (ID), a control field (CNTL) and a flag. The control field contains the identifiers of other user terminals whose images are to be displayed. The data-compressed video signal has the format as indicated by numeral 19B. This frame includes the source user's identifier field (ID), a data field (DATA) containing a 320×240-dot frame and an end-of-frame (EOF) field. If a given source user terminal is designated as "A" and it wants to display images of users B, C, D and E, the signal it receives is a blend of quarter-sized frames B, C, D and E which can be simply displayed on a full-size (640×480 dots) screen as shown in FIG. 3.

Each local teleconferencing apparatus includes data decompression decoders 25, 26 and 27 connected to receive signals from corresponding line interfaces 21, 22 and 23 for converting the compressed digital video signals to the original decompressed format. The outputs of decoders 25, 26 and 27 are connected to a video integrator 28 where the input video signals are time-compressed and assembled together to produce an integrated frame format signal which allows the original 320×240-dot frames to appear respectively in quarter areas of a full-size (640×480 dots) screen. The output of the multiplexer 28 is supplied to a data compression encoder 29 where it is data-compressed again and passed through a time-division multiplexer 30 to a line interface 24. A user's control packet received via the line interfaces 21 to 23 is passed through the multiplexer 30 to interface 24. The line interface 24 is connected to the central teleconferencing apparatus 10. The video integrator 28, known as a "video multiplexer", is available from NEC Corporation as model N4974-02.

The central teleconferencing apparatus 10 comprises a controller 40 and line interfaces 41 and 42 for interfacing to the local teleconferencing apparatus 11 and 12, respectively. Data decompression decoders 43 and 44 are respectively connected to the line interfaces 41 and 42 for recovering the original decompressed format. The outputs of decoders 43 and 44 are connected to video extraction circuits 45 and 46, respectively, in which video frames desired by user terminals are extracted under control of the controller 40 as will be described. The video frames from extraction circuits 45 and 46 are assembled in a video integrator 47 in a manner identical to that of the local teleconferencing apparatus, producing an integrated frame format signal in which the quarter-sized images are put together to allow reproduction of a full-size image. The integrated frame format signal is applied to an encoder 48 where it is data-compressed and transmitted through the line interfaces 41, 42 to the local teleconferencing apparatus 11 and 12 and broadcast to all user terminals.

As illustrated in FIG. 4, each extraction circuit includes a first-in-first-out buffer 50 and a video memory 51 which are connected in series from the associated decoder to the video integrator 47. FIFO buffers 50-1 and 50-2 respectively store the outputs of decoders 43 and 44 at the rate at which the respective video signals are data-decompressed by the associated decoders. Controller 40 includes a timing circuit 52 which is responsive to one or more control packets from line interfaces 41 and 42 for producing timing signals including enable pulses EN, a read/write command R/W and a multibit masking command indicating the location of memories 51-1 and 51-2 where the stored frames are to be masked by all zeros. Write address generators 53-1 and 53-2 are provided for supplying a write address to video memories 51-1 and 51-2, respectively, at the rate of fast clock pulses supplied from a fast clock source 55. At the same time, a write enable pulse R/W=1 is supplied from the timing circuit 52 to both of the video memories 51. Concurrently with the write operation of the video memories, the FIFO buffers 50-1 and 50-2 begin operating in a read mode in response to a read enable pulse R/E from the timing circuit 52 at the rate of the fast clock source 55, so that the stored video signals of each frame are transferred from the FIFO buffers to the corresponding video memories at a rate much higher than the rate at which they are stored into the respective FIFO buffers. Subsequently, timing circuit 52 supplies a zero bit to the data input of memories 51 and a masking command to each write address generator 53 to cause it to produce a read address which identifies the location of a field stored in the corresponding video memory 51. The location of the memories which is identified by the masking data is overwritten with the zero bits, so that a desired area of a full size screen is masked.

For reading video data from the memories 51 at the normal clock rate, read address generators 54-1 and 54-2 are associated respectively with the memories 51-1 and 51-2. Timing circuit 52 supplies an enable pulse EN2 to the read address generators 54-1 and 54-2 and a read enable pulse R/W=0 to the video memories 51. Read address generators 54-1 and 54-2 are thus enabled to receive the output of a normal rate clock source 56 for supplying a read address to the corresponding video memories 51-1, 51-2 at the normal clock rate. All video signals stored in each video memory, including the masking zero bits, are transferred to the video integrator 47 at the normal rate which corresponds to the rate at which data compression and decompression are performed.

Figure 5:
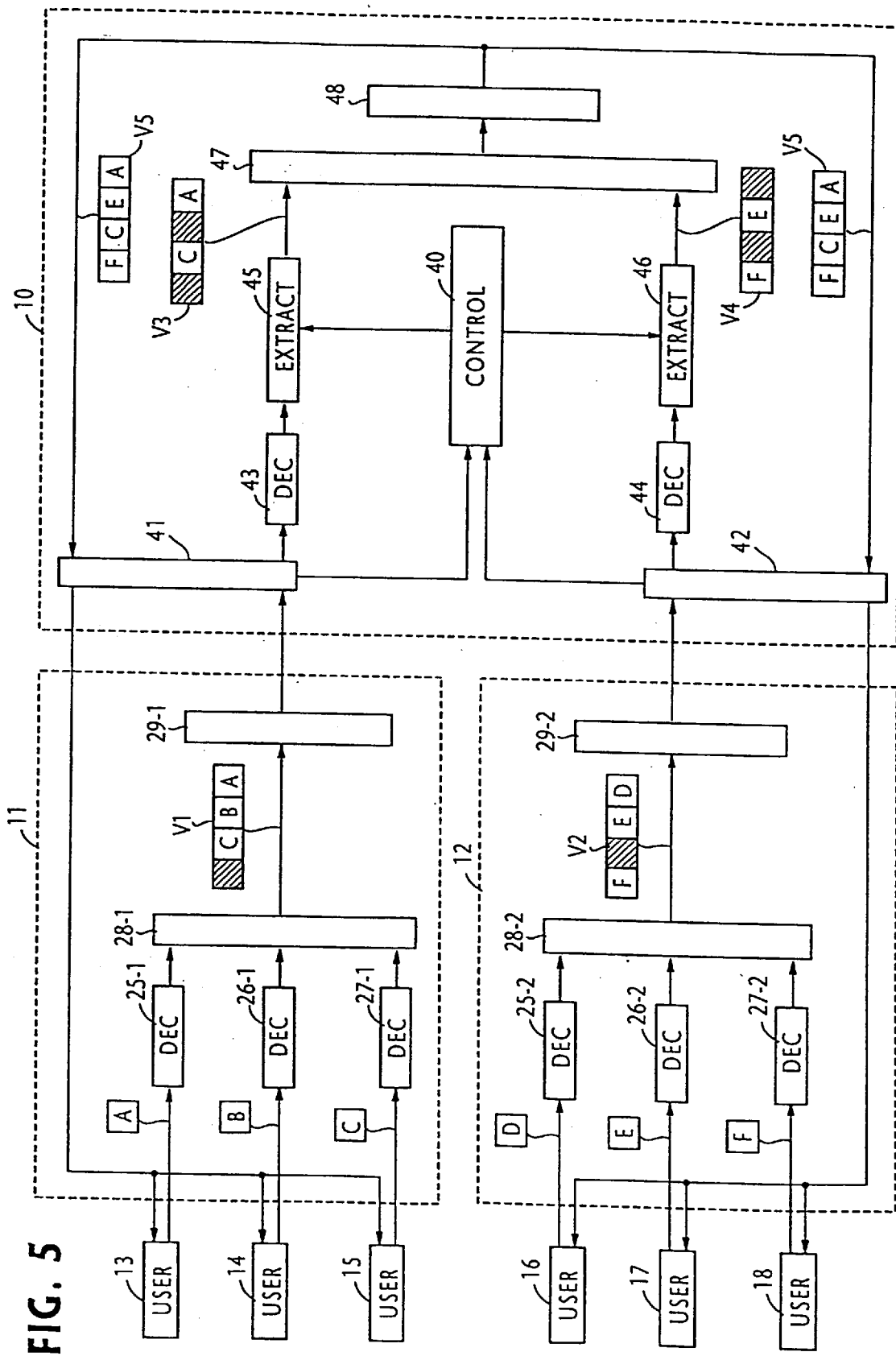
FIG. 5 shows in schematic form the operation of the first embodiment.

The operation of the FIG. 1 embodiment will best be understood with a description given below with reference to FIG. 5 by assuming that user video terminals 13 to 18 send data-compressed video signals A, B, C, D, E and F, of the 320×240-dot format, respectively. It is further assumed that one of user terminals 13 to 18 has the right to send a control packet which requests that frames A, C, E and F are to be displayed.

The data-compressed video signals A to F are decompressed in the corresponding decoders 25-1, 26-1, 27-1, 25-2, 26-2 and 27-2 of the respective local teleconferencing apparatus 11 and 12. The decompressed video signals A, B and C are multiplexed by the video integrator 28-1 into an integrated frame format signal V1 and the decompressed video signals D, E and F are multiplexed in the video integrator 28-2 into an integrated frame format signal V2. The video signals V1 and V2 are in the form which can be directly reproduced by conventional television receivers. If a 640×480-dot screen is used for reproduction, the frames A, B and C (320×240 dots) of users 13, 14, 15 would be respectively displayed on the upper-left, upper-right and lower-left areas of the screen, and the D, E and F images of users 16, 17, 18 would be respectively displayed on the upper-left, upper-right and lower-right areas of the 640×480-dot screen. The video signals V1 and V2 from multiplexers 28-1 and 28-2 are data-compressed in the encoders 29-1 and 29-2, respectively, and transmitted to the central teleconferencing apparatus 10. Control packets are also sent from user terminals to the central teleconferencing apparatus 10.

At the central teleconferencing apparatus 10, the control packets from apparatus 11 and 12 are separated by interfaces 41 and 42, respectively, and supplied to controller 40. On the other hand, the integrated video signal (containing images A, B and C) is decompressed by decoder 43 and fed into the extraction circuit 45 and the integrated video signal (containing images D, E and F) is decompressed by decoder 44 and fed into the extraction circuit 46. The decompressed video signal is stored in the FIFO buffer 50 of the extraction circuit and then transferred to the corresponding video memory 51.

By using the control packets from all the user terminals, controller 40 provides a masking operation on the signals stored in the video memories 51-1 and 51-2 corresponding to the original quarter-sized frames B and D. Following the masking operation, controller 40 causes extraction circuits 45 and 46 to read all the signals from memories 51-1 and 51-2, respectively, producing partially masked, integrated video frames V3 and V4 as shown in FIG. 5. The outputs of extraction circuits 45 and 46 are multiplexed together in the video integrator 47 and fed into encoder 48 where they are data-compressed, producing an integrated video frame V5. The integrated frame format signal V5 is applied to interfaces 41 and 42 and transmitted therefrom to the local teleconferencing apparatus 11 and 12 where it is broadcast to all user terminals. Each user terminal reproduces the original quarter-sized frames A, E, C and F on the upper-left, upper-right, lower-left and lower-right areas of a full size screen, respectively.

Figure 6:
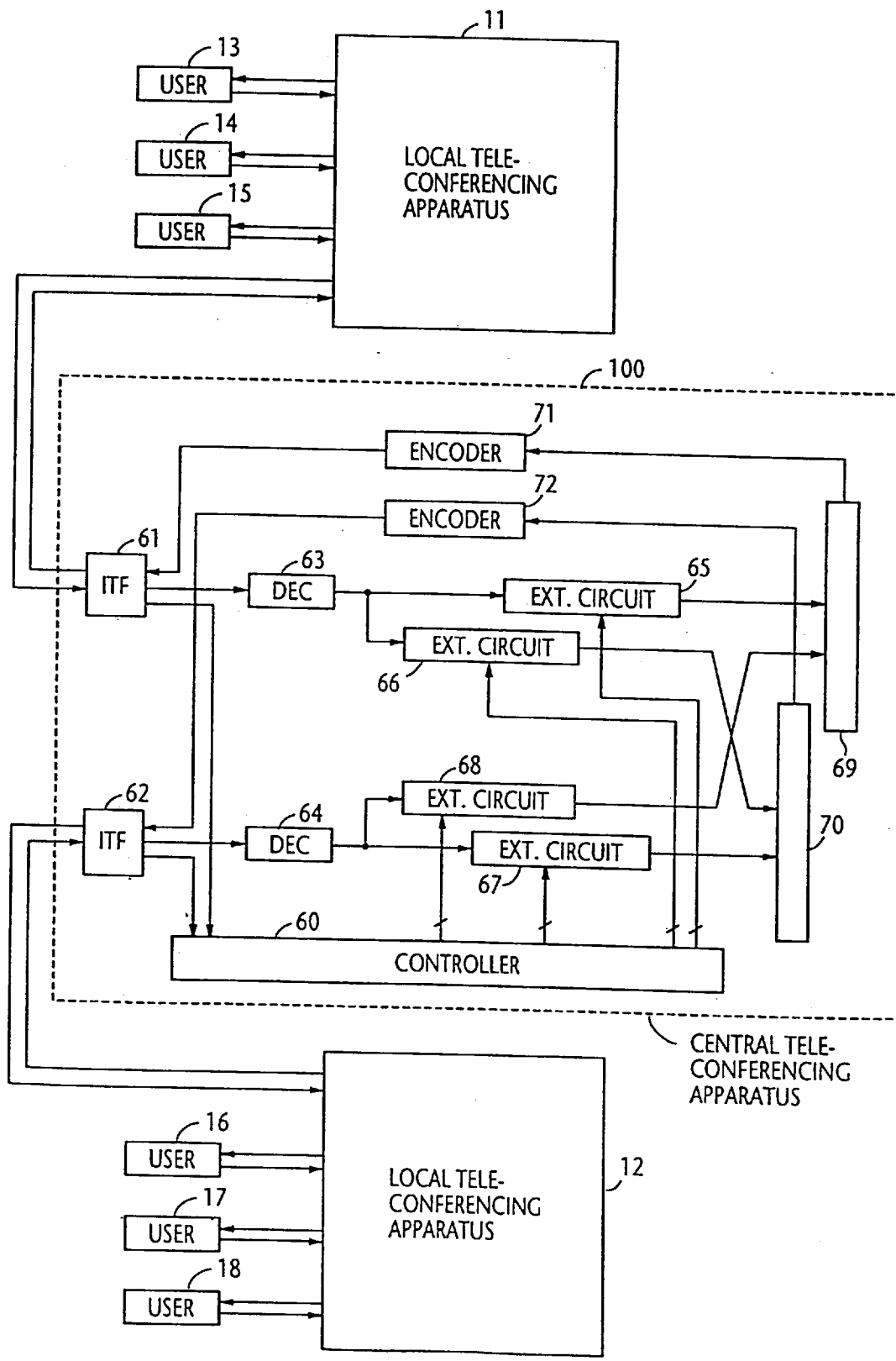
FIG. 6 shows in block diagram form a multipoint video teleconferencing system according to a second embodiment of the present invention.

A second embodiment of the present invention is shown in FIG. 6. In this embodiment, users of each group corresponding to the respective local teleconferencing apparatus are allowed to display a different video signal from that displayed on the users of the other group. For this purpose, the central teleconferencing apparatus, designated as 100, includes a pair of extraction circuits 65 and 66 connected to receive combined video frames sent from the local teleconferencing apparatus 11 via line interface 61 and decoder 63 and a pair of extraction circuits 67 and 68 connected to receive combined video frames sent from the local teleconferencing apparatus 12 via line interface 62 and decoder 64. All the extraction circuits process their input signals under control of a controller 60 in a way similar to that described with reference to FIG. 4.

The outputs of extraction circuits 65 and 68 are combined in a video integrator 69 and those of the extraction circuits 66 and 67 are combined in a video integrator 70. The outputs of video integrators 69 and are respectively coupled to encoders 71 and 72 where the combined video frames are data-compressed and transmitted through interfaces 61 and 62 to the local teleconferencing apparatus 11 and 1 2, respectively, where they are broadcast to the user terminals.

Figure 7:
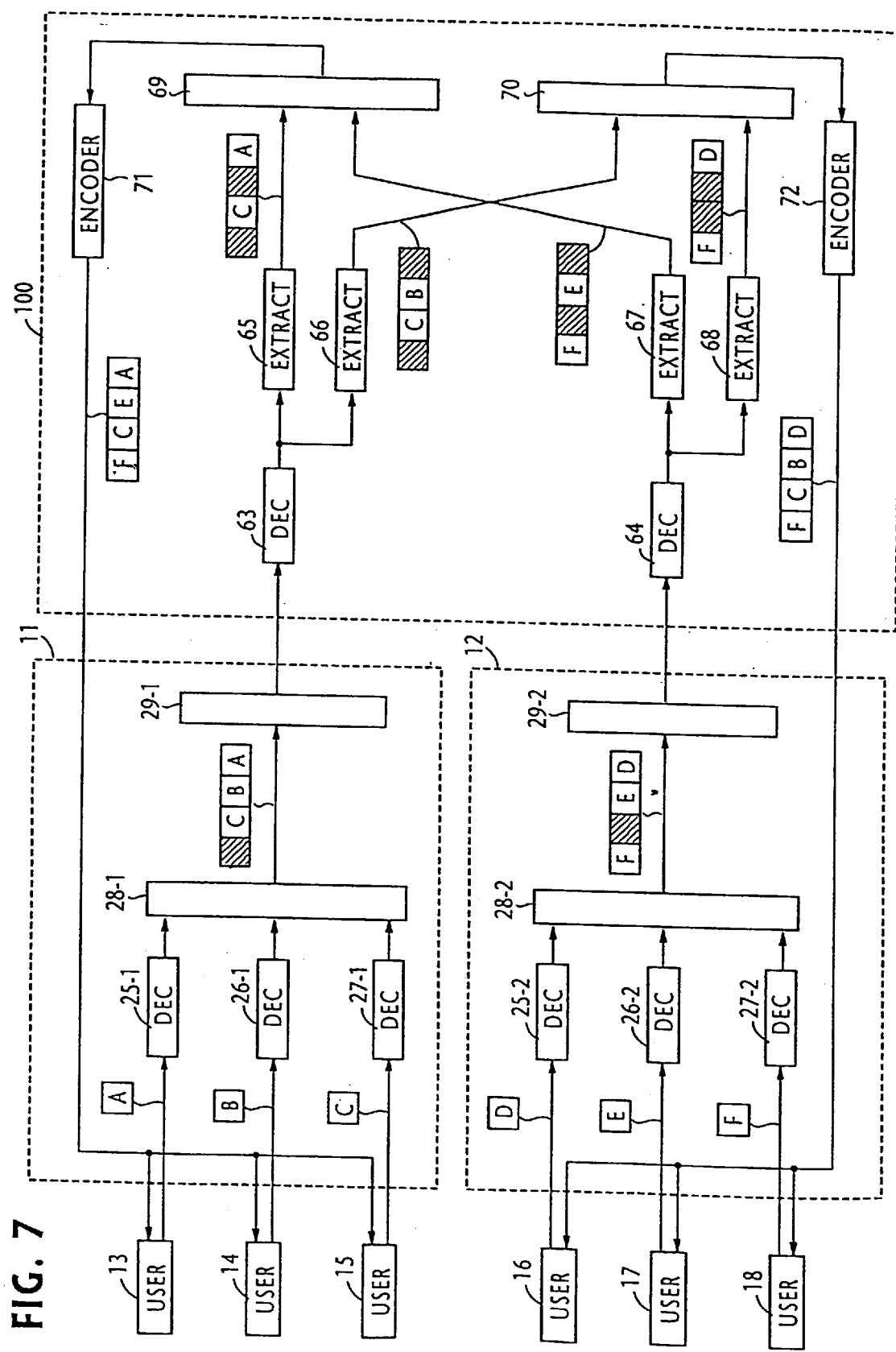
FIG. 7 shows in schematic form the operation of the second embodiment.

The operation of the system of FIG. 6 will be described with reference to FIG. 7 by assuming that one of user terminals 13 to 15 has the right to send a control packet requesting that they want to display frames A, E, C and F and one of user terminals 16 to 18 has the right to send a control packet requesting that they want to display frames D, B, C and F.

The outputs of integrators 28-1 and 28-2 are input to encoders 29-1 and 29-2, respectively. The output of encoder 29-1 is decompressed by decoder 63 and the frames A and C of the video signal are extracted by extraction circuit 65 by masking the frame B and fed to video integrator 69, and the frames B and C of the encoder 29-1 output are extracted by extraction circuit 66 by masking the frame A and fed to video integrator 70. On the other hand, the output of encoder 29-2 is decompressed by decoder 64 and the frames E and F of the encoder 29-2 output are extracted by extraction circuit 67 by masking the frame D and fed to video integrator 69, and the frames D and F of the signal are extracted by extraction circuit 68 by masking the frame E and fed to video integrator 70. As a result, frames A and C are integrated with frames E and F in the video integrator 69 and supplied to encoder 71 where they are data-compressed for transmission to user terminals 13 to 15. Likewise, frames B and C are integrated with frames D and F by video integrator 70 and fed to encoder 72 where they are data-compressed for transmission to user terminals 16 to 18.

Figure 8:
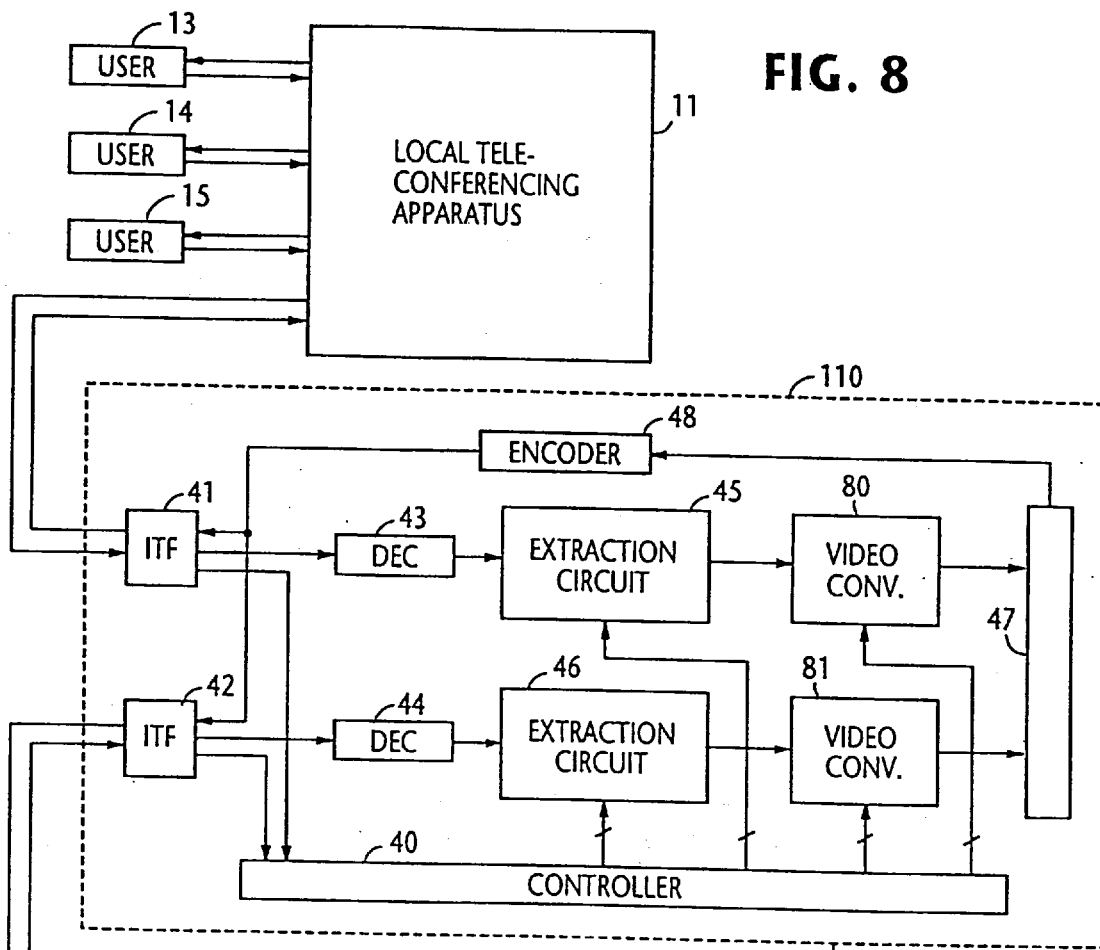
FIG. 8 shows in block diagram form a multipoint video teleconferencing system according to a third embodiment of the present invention.

A third embodiment of the present invention is shown in FIG. 8. According to this embodiment, the central teleconferencing apparatus, indicated by numeral 11 0, is a modification of the apparatus 10 of FIG. 1 by the provision of video converters 80 and 81, which are respectively connected to the outputs of extraction circuits 45 and 46. Each video converter provides the enlarging of a frame by regularly duplicating picture elements of the frame, the reducing of the frame by regularly depreciating picture elements of the frame, and the shifting of the frame to a different location of the screen under control of the controller 40 in response to a user control packet sent from one of the user terminals, including data specifying the enlargement/reduction ratio and the locations of the processed frames in addition to the identifiers of frames to be displayed. The outputs of the video converters 80 and 81 are multiplexed in the video integrator 28 in the same manner as described previously.

Figure 10:
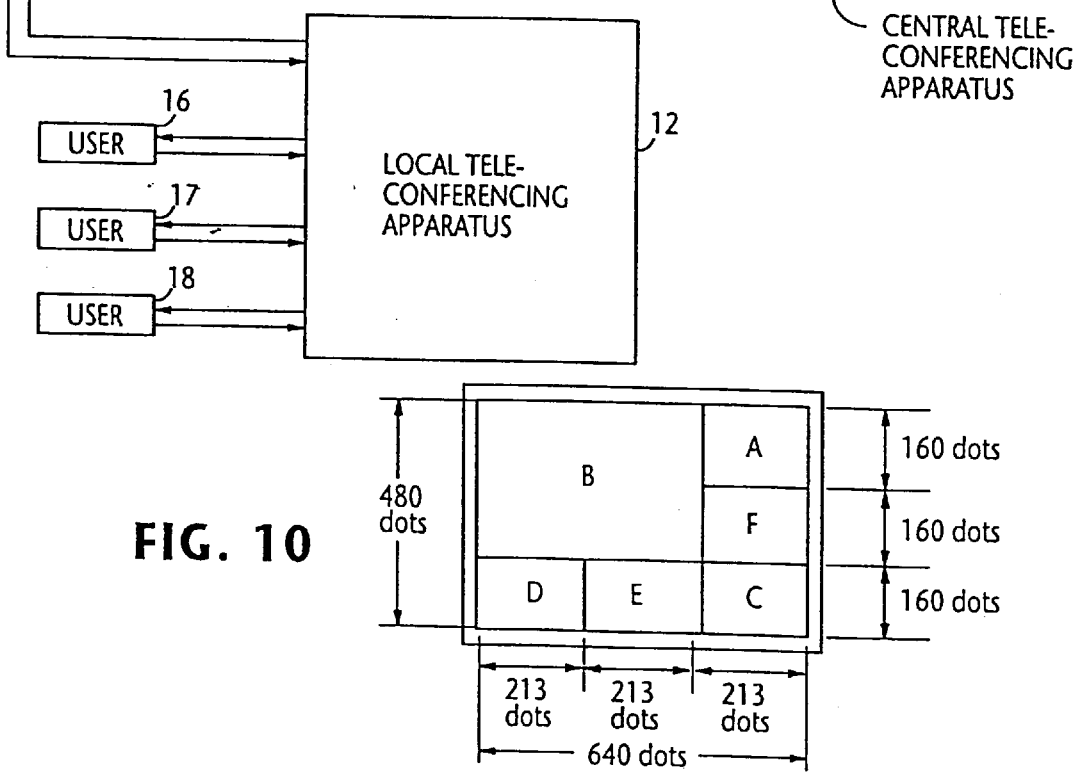
FIG. 10 shows a typical example of a full-size monitor screen on which variously sized frames of user terminals are displayed.

The operation of the third embodiment will be described with reference to FIG. 9 in which user terminals 15' and 18' are additionally provided to send their frames C' and F', respectively to local teleconferencing apparatus 11 and 12. One of the eight user terminals sends a control packet requesting that six frames A, B, C, D, E and F be displayed on each of their screens with frame B expanded by a factor of about 1.33 and displayed on the upper-right area of the screen, with the other frames being reduced by a factor of about 0.66 and displayed in locations as illustrated in FIG. 10.

Figure 9:
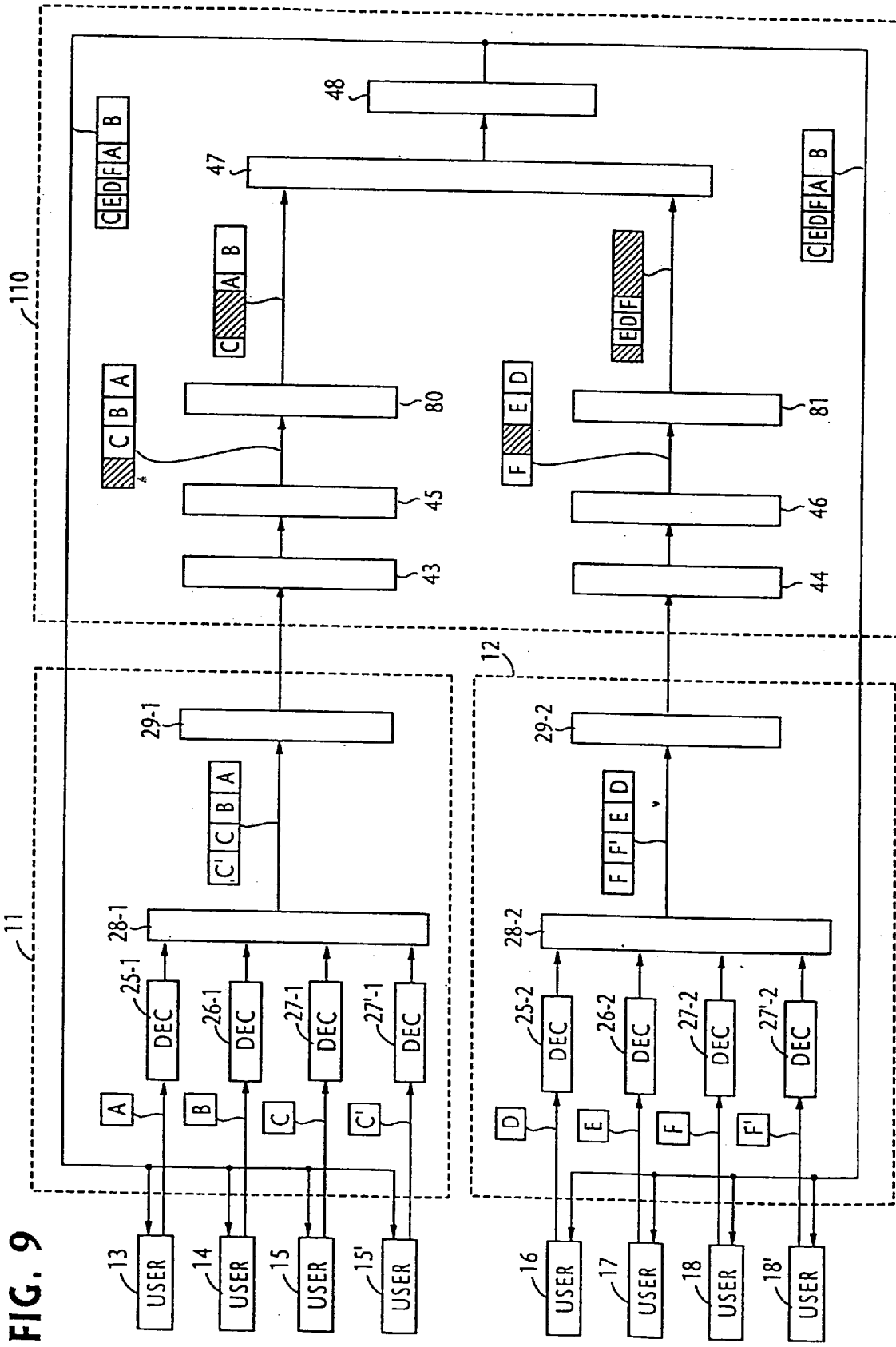
FIG. 9 shows in schematic form the operation of the third embodiment of this invention.

In FIG. 9, video frames A, B, C and C' are multiplexed in video integrator 28-1 and data-compressed by encoder 29-1 and transmitted to the central teleconferencing apparatus 110. After data decompression at decoder 43 and frame extraction at extraction circuit 45 by masking frame C', frames A, B and C are processed by video converter 80 so that frame B is enlarged by a factor 1.33 and shifted to the location of an integrated frame format signal which corresponds to the upper left area of a full size screen, and frames A and C are reduced by a factor 0.66 and shifted to the locations of the integrated frame format signal corresponding respectively to the upper-right and lower-right areas of the screen.

In a similar manner, frames D, E, F and F' are multiplexed in video integrator 28-2 and data-compressed by encoder 29-2 and transmitted to the central teleconferencing apparatus 110. After data decompression at decoder 44 and frame extraction at extraction circuit 46 by masking the original quarter-sized frame F', the other frames D, E and F are processed by video converter 81 so that they are reduced in size by a factor 0.66 and shifted to the locations of an integrated frame format signal which locations correspond respectively to the lower-left, lower-middle and middle-left areas of a full-size screen (FIG. 10).

Video integrator 47 provides the multiplexing of the converted video frames. The output of multiplexer 47 is data-compressed by encoder 48, producing an integrated frame format signal consisting of the converted and shifted, quarter-sized frames B, A, F, D E and C for transmission to all the user terminals.

A fourth embodiment of the present invention is illustrated in FIGS. 11 to 14. According to this embodiment, each user terminal has the right to send a particular control packet and is capable of sending data-compressed video signals in a multiplexed frame format (both full-size and quarter-size) or in a single frame format (full-size), or in a combination of a quarter-size single frame format and a full-size single frame format. A teleconferencing apparatus processes the incoming signals without data decompression and produces a concatenated series (multiplex) of quarter-sized frames or a single full-sized frame depending on the control packets from the user terminals. Using the user identifiers and size reduction ratios contained in the received frame, each user terminal reconstructs an assembled image on a full-size screen.

Figure 11:
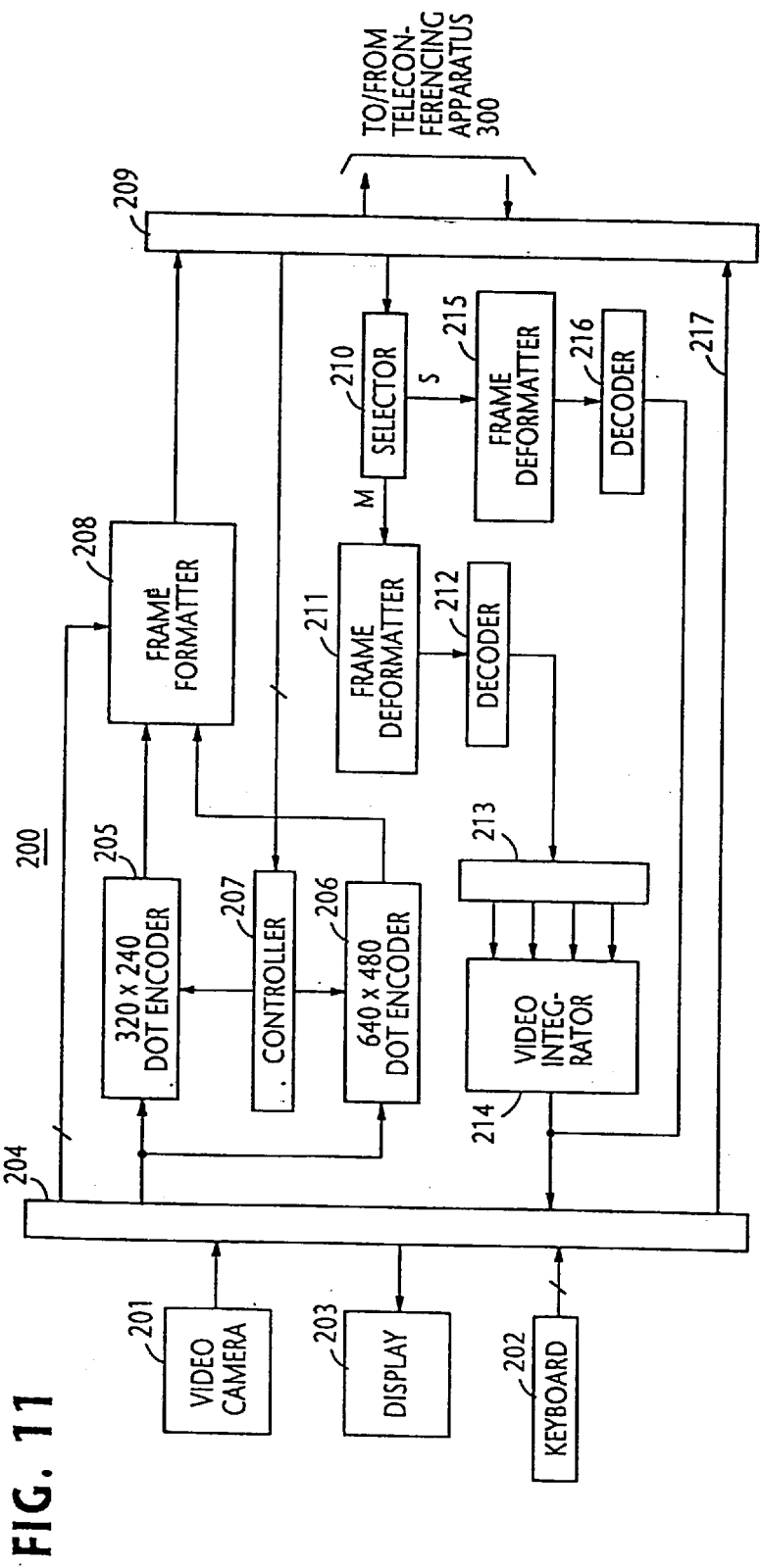
FIG. 11 shows in block diagram form a user terminal according to a fourth embodiment of the present invention.
Figure 12:
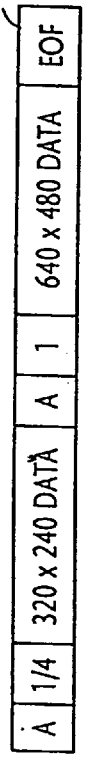
FIG. 12 shows data structures of data sent from the user terminal of FIG. 11.

In FIG. 11, details of a user terminal 200 is illustrated. A frame format signal produced by a video camera 201 is applied through an interface 204 to a 320×240-dot data compression encoder 205 as well as to a 640×480-dot data compression encoder 206. The 320×240-dot encoder 205 provides data compression according to the JPEG standards, while the 640×480-dot encoder 206 provides data compression according to the CCITT H. 261 Recommendation. One of these encoders or both are enabled by a-controller 207 according to a command signal supplied via a network interface 209. Control data including the user's identifier and a frame reduction ratio are supplied from a keyboard 202 and fed via interface 204 to a frame formatter 208 to which the outputs of encoders 205 and 206 are connected. By using the control data, frame formatter 208 composes the input signals into a multiframe format 220 or a single frame format 221 or 222 (see FIG. 12). The multiframe format 220 includes two data fields respectively containing 320×240-dot frame and a 640×480-dot data. Each of these data fields is preceded by the source user's identifier (ID) field and a frame reduction ratio field. Reduction ratios 1/4 and 1 are inserted into the ratio fields for 320×240-dot and 640×480-dot frames, respectively. Each frame format is marked by an end-of-frame field.

Figure 13:
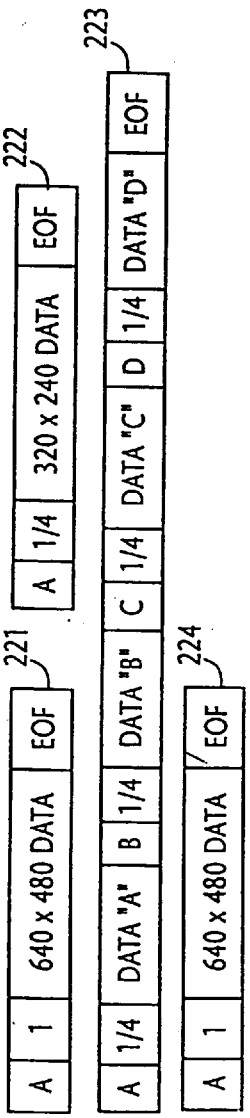
FIG. 13 shows data structures of network data received by the user terminal of FIG. 11.
Figure 14:
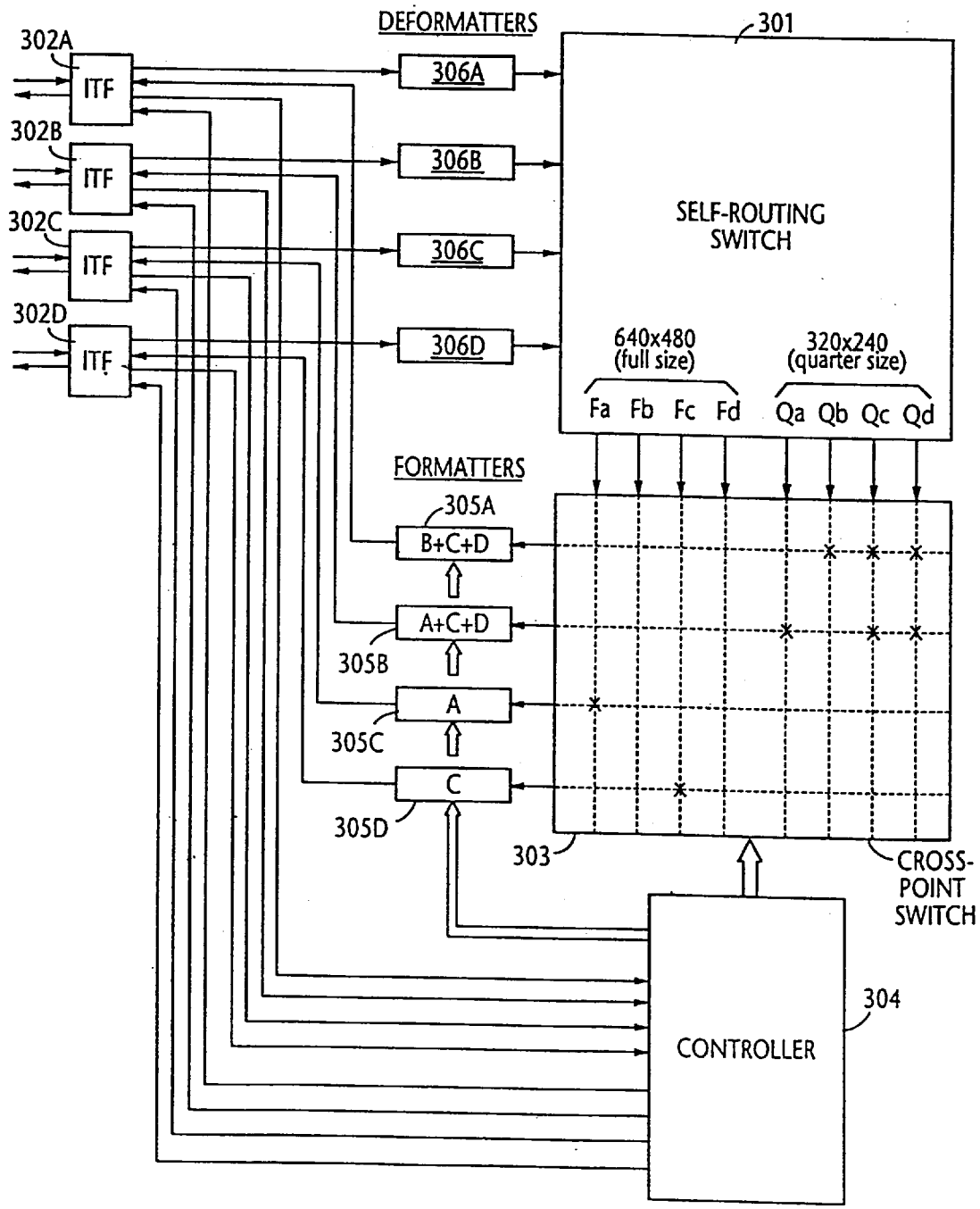
FIG. 14 shows in block diagram form a teleconferencing apparatus according to the fourth embodiment of this invention.

A control packet as used in the previous embodiments is produced by the keyboard 202 for requesting desired frames to be displayed. This control packet is applied via line 217 to the line interface 209 for transmission to a teleconferencing apparatus 300 (FIG. 14). Two types of video data format is also available for transmission from the network to the user terminals, i.e., a multiframe format 223 which includes a series of 320×240-dot frames and a 640×480-dot single frame format 224 as shown in FIG. 13. The network data from the teleconferencing apparatus 300 is received through the line interface 209 and applied to a selector 210 which examines the frame format to selectively forward the input signal to a frame deformatter 211 if the signal is in a multiframe format or to a frame deformatter 215 if it are in a single frame format. In each of the deformatters, the incoming frame format is decomposed and video information is extracted. The output of frame deformatter 211 is coupled to a data decompression decoder 212 where it is data decompressed and applied to a demultiplexer 213. The multiplexed video frames of the output of decoder 212 are separated from each other in demultiplexer 213 and supplied to a video integrator 214 of the type discussed previously to integrate the individual video frames into a full-screen image for display on a display unit 203. On the other hand, the output of deformatter 215 is data-decompressed in a decoder 216 and applied to display unit 203 to provide a display of a single image of 640×480 dots.

In FIG. 14, the teleconferencing apparatus 300 receives incoming video signals either in single or multiframe format from a plurality of line interfaces 302A~302D which are connected respectively to the user terminals 200A~200D. The outputs of line interfaces 302A~302D are fed to frame deformatters 306A~306D respectively where the incoming signals are deformatted and supplied to a self-routing switch 301. Self-routing switch 301 examines the user identifier fields and frame reduction fields of each incoming signal and routes the deformatted video frames to one of the output ports of the switch according to the user identifier and reduction ratio of each video frame data. If the signal at the input of deformatter 306A is in a multiframe format as shown at 220 (FIG. 12), it is decomposed into individual 320×240-dot frame and 6400×480-dot frame and the self-routing switch 301 applies the 320×240-dot frame to a corresponding one of quarter-size output ports Qa, Qb, Qc and Qd, and the 640×480-dot frame to a corresponding one of full-size output ports Fa, Fb, Fc and Fd. The output ports Qa, Qb, Qc and Qd and Fa, Fb, Fc and Fd are associated respectively with interfaces 302A~302D and hence with user terminals 200A~200D. Therefore, the decomposed quarter-size frame of the signal from user terminal 200A is routed to output port Qa and the decomposed full-size frame is routed to output port Fa. The output ports of the self-routing switch 301 are connected respectively to corresponding input ports of a cross-point switch 303 which operates under control of a controller 304 to establish a connection. At least one of the line interfaces 302 may be used for interconnecting a plurality of teleconferencing apparatus 300 in an interlinked or hierarchical configuration to form a video teleconferencing network. In such instances, controller 304 may receive control packets which identify user terminals not directly served by the teleconferencing apparatus of the controller. In this case, the controller passes the control packets as well as the associated video signals to an appropriate destination apparatus.

Controller 304 receives control packets from source user terminals 200 via corresponding line interfaces 302 to determine which decomposed frame is to be transmitted to which user terminal and returns control packets to destination user terminals via the interfaces 302 to permit their controller 207 to operate one or both of the data-compression encoders 205 and 206.

According to the control packets from the users, controller 304 operates the cross-point switch 303 to establish a connection from one of the input ports of the switch to one of its four output ports which are connected respectively to frame formatters 305A~305D. In addition, cross-controller 304 supplies appropriate user identifiers and reduction ratio data to the frame formatters 305A~305D to allow them to compose decomposed frames into a single-frame or a multiframe-format for transmission to the user terminals via corresponding interfaces 302A~302D.

If user terminals 200A~200D respectively request that signals in multiframe formats (B+C+D) and (A+C+D) and single frame formats A and C to be displayed on their screen, controller 304 operates the controller 207 of user terminals 200A and 200B so that both of the data-compression encoders 205 and 206 are enabled simultaneously to transmit a multiframe format signal 220. On the other hand, controller 304 instructs the controller 207 at user terminals 200C and 200D so that their encoder 206 is enabled to transmit a single frame format signal 221.

The user 200A signal in multiframe format 220 is decomposed into the quarter-size frame and full-size frame by deformatter 306A and routed in switch 301 to output ports Qa and Fa, respectively. In like manner, the user 200B signal in multiframe format 220 is decomposed into the quarter-size frame and full-size frame by deformatter 306B and routed to output ports Qb and- Fb, respectively. On the other hand, signals from the user terminals 200C and 200D in single frame format 221 are routed to output ports Fc and Fd, respectively. By using the users' control packets, controller 304 operates the cross-point switch 303 to establish connections from output ports Qb, Qc, Qd to formatter 305A so that the quarter-size frames B, C and D are switched to the formatter 305A to which the identifiers of users B, C and D and a signal indicating the reduction ratio 1/4 are supplied from controller 304. Formatter 305A composes these frames into a multiframe format as shown at 223 (FIG. 13) and transmits it to user terminal 200A via line interface 302A. In a similar manner, connections are established in switch 303 from output ports Qa, Qc and Qd of switch 301 to formatter 305B for transmitting a multiframe format signal containing frames A, C and D to user terminal 200B via line interface 302B. Controller 304 further establishes connections from output ports Fa and Fc to formatters 305C and 305D, respectively, and applies the identifiers of users 200A and 200C as well as a signal indicating the full-size ratio 1 to the formatters 305C and 305D, respectively, for transmitting a single full-size frame 224 to each of these destination user terminals via interfaces 302C and 302D.

Instead of using the combination of multiframe format 220 and full-size single frame format 221, a combination of full-size single frame format 221 and quarter-size single frame format 222 can be used. In this case, controller 207 of the user terminal sequentially enables the data-compression encoders 205 and 206. In response, frame formatter 208 sequentially processes the outputs of encoders 205 and 206, producing a sequence of frames 222 and 221.

If user terminals are remotely located from each other, it is preferred that user signals be processed through a network of video teleconferencing apparatus by using the teleconferencing apparatus 300 as local teleconferencing apparatus and/or a central teleconferencing apparatus in an interlinked configuration or a hierarchical configuration. Since the frame formats used for user-to-network communication are essentially the same as those used for network-to-user communication (FIGS. 12 and 13), the teleconferencing apparatus 300 can be advantageously used both as a local or a central teleconferencing apparatus. In such instances, each teleconferencing apparatus treats other teleconferencing apparatus as a user terminal. The interlinked configuration is shown in FIG. 15 in which a plurality of teleconferencing apparatus 300-1~300-n are interlinked by digital communications channels using one or more of the line interfaces and user terminals 200-1~200-n are served by other line interfaces. The hierarchical configuration is shown in FIG. 16 in which a plurality of local teleconferencing apparatus 300-1~300-n are interconnected to a central teleconferencing apparatus 300-c which also directly serves user terminals 200-c.

What is claimed is:

1. A video teleconferencing apparatus comprising:
  a plurality of interface means connected to a plurality of communication channels for receiving data-compressed integrated frame format signals, each of the integrated frame format signals containing a plurality of video frames of user terminals;
  a plurality of data decompression decoders respectively connected to said interface means for decompressing said integrated data-compressed video signals and producing a plurality of data-decompressed integrated frame format signals;
  control means connected to said interface means for receiving control signals from said channels and producing therefrom an address signal;
  a plurality of extraction means respectively connected to said decoders for extracting desired ones of the video frames from each of said data-decompressed integrated frame format signals in accordance with the address signal from the control means;
  video integrator means for integrating output signals of said plurality of extraction means and producing an integrated video output signal; and
  data compression encoder means for compressing the integrated video output signal and coupling the compressed signal to said interface means.

2. A video teleconferencing apparatus as claimed in claim 1, further comprising a plurality of video converter means connected respectively to receive the output signals from said extraction means for enlarging, reducing and shifting images contained in each of said output signals.

3. A video teleconferencing apparatus comprising:
  first and second interface means connected to communication channels for receiving data-compressed integrated frame format signals, each containing a plurality of video signals of user terminals;
  first and second data-decompression decoders for respectively decompressing the data-compressed integrated frame format signals from said first and second interface means and producing first and second data-decompressed integrated frame format signals, respectively;
  control means connected to said interface means for receiving control signals from said channels and producing an address signal;
  first and second extraction means connected to said first data-decompression decoder for extracting desired ones of the data-decompressed video signal therefrom in accordance with the address signal from the control means;
  third and fourth extraction means connected to said second data-decompression decoder for extracting desired ones of the data-decompressed video signal therefrom in accordance with the address signal from the control means;
  first video integrator means for integrating output signals of said first and third extraction means and producing a first integrated frame format signal;
  second video integrator means for integrating output signals of said second and fourth extraction means and producing a second integrated frame format signal; and
  first and second data-compression encoder means for respectively compressing the first and second integrated frame format signals and coupling the compressed signals to said first and second interface means, respectively.

4. A video communication system comprising:
  a plurality of local teleconferencing apparatus respectively associated with groups of user terminals for receiving data-compressed video signals, each of the local teleconferencing apparatus comprising:
    a plurality of data decompression decoder means for decompressing the video signals from the user terminals of the associated group;
    a video integrator for integrating output signals of said decoder means and producing an integrated frame format signal;
    data compression encoder means for compressing the integrated frame format signal; and
    means for combining the data-compressed integrated frame format signal with control signals from the user terminals of the associated group; and
  a central teleconferencing apparatus comprising:
    a plurality of interface means connected respectively to said local teleconferencing apparatus for receiving the data-compressed integrated frame format signal and said control signals;
    a plurality of data decompression decoder means respectively connected to said interface means for decompressing the data-compressed integrated frame format signals from the interface means and producing a plurality of data-decompressed integrated frame format signals;
    control means connected to said interface means for receiving the control signals via said interface means and producing therefrom an address signal;
    a plurality of extraction means respectively connected to said decoders for extracting desired ones of said video signals from each of said data-decompressed integrated frame format signals in accordance with the address signal from the control means;
    video integrator means for integrating output signals of said plurality of extraction means and producing an integrated frame format signal; and data compression encoder means for compressing the integrated frame format signal and transmitting the compressed integrated frame format signal to each of said local teleconferencing apparatus via said interface means.

5. A video teleconferencing apparatus comprising:

a plurality of interface means respectively connected to communication channels for receiving data-compressed video signals therefrom, each of the video signals containing a full-size frame, a smaller-than-full-size frame, or a multiplex of the full-size and smaller-than-full-size frames;

control means connected to said interface means for receiving control signals from said channels;

a plurality of frame deformatting means connected respectively to the interface means for decomposing the video signals therefrom into constituent frames;

switch means having a plurality of input ports connected respectively to said frame deformatting means to receive the decomposed frames therefrom and a plurality of output ports, said switch means being connected to said control means for routing each of the decomposed frames to one of the output ports according to a command signal from the control means; and a plurality of frame formatting means connected respectively between the output ports of said switch means and said plurality of interface means, each of the frame formatting means being connected to said control means to respond to a second command signal therefrom for converting a plurality of decomposed smaller-than-full-size frames routed thereto via the corresponding output port into a multiframe format signal and a decomposed full-size frame routed thereto via the corresponding output port into a single frame format signal, said multiframe format signal and said single frame format signal being supplied to a corresponding one of said interface means.

6. A video teleconferencing apparatus as claimed in claim 5, wherein said switch means comprises a self-routing switch for routing each of the decomposed frames according to identity and screen size information of the frame and a space switch for routing said frame routed by said self-routing switch to one of the output ports of the switch means according to said command signal from the control means.

7. A video communication system comprising a plurality of user terminals, and a teleconferencing apparatus, each of the user terminals comprising:

data compression encoder means for producing a first data-compressed video signal of a full-size frame format, a second data-compressed video signal of a smaller-than-full-size frame format, or a multiplex of said first and second data-compressed video signals in response to a command signal;

frame formatting means for converting the output signal of the data compression encoder means into a single frame format signal or a multiframe format signal and forwarding the output signal of said frame formatting means to a communication channel;

frame deformatting means for decomposing a video signal supplied from said communication channel into constituent frames;

data decompression decoder means for decompressing the constituent frames and supplying the decomposed frames to a display means if the frames are of the full-size frame format; and means for converting the decompressed frames into an integrated frame format signal if the decomposed frames are of the smaller-than-full-size frame format, and applying the integrated frame format signal to the display means, the teleconferencing apparatus comprising:

a plurality of first interface means respectively connected to said user terminals via respective communication channels for receiving data-compressed video signals therefrom;

a second interface means connected to another one of said teleconferencing apparatus;

control means connected to said first and second interface means for receiving control signals from said user terminals for producing therefrom a plurality of command signals and transmitting a first one of the command signals to the data compression encoder means of each of said user terminals via said interface means;

a plurality of frame deformatting means connected respectively to said interface means for decomposing the video signals therefrom into constituent frames;

switch means having a plurality of input ports connected respectively to said frame deformatting means to receive the decomposed constituent frames and a plurality of output ports, said switch means routing each of the decomposed frames to one of the output ports in accordance with a second one of said command signals; and a plurality of frame formatting means connected respectively between the output ports of said switch means and said plurality of interface means, each of the frame formatting means being responsive to a third one of said command signals for converting a plurality of decomposed smaller-than-full-size frames routed thereto via the corresponding output port into a multiframe format signal and converting a decomposed full-size frame routed thereto via the corresponding output port into a single frame format signal, said multiframe format signal and said single frame format signal being supplied to a corresponding one of said first and second interface means.

8. A video communication system as claimed in claim 7, wherein said switch means comprises a self-routing switch for routing each of the decomposed frames according to identity and screen size information of the frame and a space switch for routing said frame routed by said self-routing switch to one of the output ports of the switch means according to said command signal from the control means.

9. A video communication system comprising a plurality of groups of user terminals, and a plurality of teleconferencing apparatus respectively associated with said groups of user terminals, each of the user terminals comprising:

data compression encoder means for producing a first data-compressed video signal of a full-size frame format, a second data-compressed video signal of a smaller-than-full-size frame format, or a multiplex of said first and second data-compressed video signals in response to a command signal;

frame formatting means for converting the output signal of the data compression encoder means into a single frame format signal or a multiframe format signal and forwarding the output signal of said frame formatting means to a communication channel;

frame deformatting means for decomposing a video signal supplied from said communication channel into constituent frames;

data decompression decoder means for decompressing the constituent frames and supplying the decomposed frames to a display means if the frames are of the full-size frame format; and means for converting the decompressed frames into an integrated frame format signal if the decompressed frames are of the smaller-than-full-size frame format, and applying the integrated frame format signal to the display means, each of the teleconferencing apparatus comprising:

a plurality of first interface means respectively connected to said user terminals via respective communication channels for receiving data-compressed video signals therefrom;

a second interface means connected to another one of said teleconferencing apparatus;

control means connected to said first and second interface means for receiving control signals from said user terminals for producing therefrom a plurality of command signals and transmitting a first one of the command signals to the data compression encoder means of each of said user terminals via said interface means;

a plurality of frame deformatting means connected respectively to said interface means for decomposing the video signals therefrom into constituent frames;

switch means having a plurality of input ports connected respectively to said frame deformatting means to receive the decomposed constituent frames and a plurality of output ports, said switch means routing each of the decomposed frames to one of the output ports in accordance with a second one of said command signals; and a plurality of frame formatting means connected respectively between the output ports of said switch means and said plurality of interface means, each of the frame formatting means being responsive to a third one of said command signals for converting a plurality of decomposed smaller-than-full-size frames routed thereto via the corresponding output port into a multiframe format signal and converting a decomposed full-size frame routed thereto via the corresponding output port into a single frame format signal, said multiframe format signal and said single frame format signal being supplied to a corresponding one of said first and second interface means.

10. A video communication system as claimed in claim 9, wherein said switch means comprises a self-routing switch for routing each of the decomposed frames according to identity and screen size information of the frame and a space switch for routing said frame routed by said self-routing switch to one of the output ports of the switch means according to said command signal from the control means.

11. A video communication system comprising a plurality of groups of user terminals, a plurality of local teleconferencing apparatus respectively associated with said groups of user terminals and a central teleconferencing apparatus, each of the user terminals comprising:

data compression encoder means for producing a first data-compressed video signal of a full-size frame format, a second data-compressed video signal of a smaller-than-full-size frame format, or a multiplex of said first and second data-compressed video signals in response to a command signal;

frame formatting means for converting the output signal of the data compression encoder means into a single frame format signal or a multiframe format signal and forwarding the output signal of said frame formatting means to a communication channel;

frame deformatting means for decomposing a video signal supplied from said communication channel into constituent frames;

data decompression decoder means for decompressing the constituent frames and supplying the decomposed frames to a display means if the frames are of the full-size frame format; and means for converting the decompressed frames into an integrated frame format signal if the decomposed frames are of the smaller-than-full-size frame format, and applying the integrated frame format signal to the display means, each of the local teleconferencing apparatus comprising:

a plurality of first interface means respectively connected to said user terminals via respective communication channels;

a second interface means connected to said central teleconferencing apparatus;

control means connected to said first and second interface means for receiving control signals from said user terminals for producing therefrom a plurality of command signals and transmitting a first one of the command signals to the data compression encoder means of each of said user terminals via said interface means;

a plurality of frame deformatting means connected respectively to said interface means for decomposing the video signals therefrom into constituent frames;

switch means having a plurality of input ports connected respectively to said frame deformatting means to receive the decomposed constituent frames and a plurality of output ports, said switch means routing each of the decomposed frames to one of the output ports in accordance with a second one of said command signals; and a plurality of frame formatting means connected respectively between the output ports of said switch means and said plurality of interface means, each of the frame formatting means being responsive to a third one of said command signals for converting a plurality of decomposed smaller-than-full-size frames routed thereto via the corresponding output port into a multiframe format signal and converting a decomposed full-size frame routed thereto via the corresponding output port into a single frame format signal, said multiframe format signal and said single frame format signal being supplied to a corresponding one of said first and second interface means, said central teleconferencing apparatus comprising:

a plurality of interface means respectively connected to said local teleconferencing apparatus via communication channels;

control means connected to said interface means for receiving control signals from said local teleconferencing apparatus for producing therefrom a plurality of command signals;

a plurality of frame deformatting means connected respectively to said interface means for decomposing the video signals therefrom into constituent frames;

switch means having a plurality of input ports connected respectively to said frame deformatting means to receive the decomposed constituent frames and a plurality of output ports, said switch means routing each of the decomposed frames to one of the output ports in accordance with a second one of said command signals; and a plurality of frame formatting means connected respectively between the output ports of said switch means and said plurality of interface means, each of the frame formatting means being responsive to a third one of said command signals for converting a plurality of decomposed smaller-than-full-size frames routed thereto via the corresponding output port into a multiframe format signal and converting a decomposed full-size frame routed thereto via the corresponding output port into a single frame format signal, said multiframe format signal and said single frame format signal being supplied to a corresponding one of said interface means.

12. A video communication system as claimed in claim 11, wherein said switch means of each of said local teleconferencing apparatus and said central teleconferencing apparatus comprises a self-routing switch for routing each of the decomposed frames according to identity and screen size information of the frame and a space switch for routing said frame routed by said self-routing switch to one of the output ports of the switch means according to said command signal from the control means.

13. A video teleconferencing user terminal comprising:

data compression encoder means for producing a first data-compressed video signal having a full-size frame format, a second data-compressed video signal having a smaller-than-full-size frame format, or a multiplex of said first and second data-compressed video signals in response to a command signal supplied from a communication channel;

frame formatting means for converting the output signal of the data compression encoder means into a single frame format signal or a multiframe format signal and forwarding the output signal of said frame formatting means to the communication channel;

frame deformatting means for processing a video signal received from a network teleconferencing apparatus via the communication channel into one or more constituent frames;

data compression decoder means for decompressing the constituent frames and supplying the constituent frames to a display means for displaying a single frame format image if the frames correspond to a full-size frame format; and means for converting the constituent frames into an integrated frame format signal if the constituent frames correspond to a smaller-than-full-size frame format, and applying the integrated frame format signal to the display means for displaying a multi-frame format image.

14. A video teleconferencing user terminal comprising:

a selection means for receiving a command signal from a communication channel;

data compression encoder means, responsive to said selection means, for producing a first data-compressed video signal having a full-size frame format, a second data-compressed video signal having a smaller-than-full-size frame format, or a multiplex of said first and second data-compressed video signals;

frame formatting means for converting the output signal of the data compression encoder means into a single frame format signal or a multiframe format signal and forwarding the output signal of said frame formatting means to the communication channel;

frame deformatting means for decomposing a video signal supplied from the communication channel into constituent frames;

data decompression decoder means for decompressing the constituent frames and supplying the decomposed frames to a display means if the frames are of full-size frame format; and means for converting the decompressed frames into an integrated frame format signal if the decomposed frames are of smaller-than-full-size frame format, and applying the integrated frame format signal to the display means.

15. A video teleconferencing user terminal comprising:

a first selection means for receiving a first command signal from a communication channel;

data compression encoder means, responsive to said first selection means, for producing a first data-compressed video signal having a full-size frame format, a second data-compressed video signal having a smaller-than-full-size frame format, or a multiplex of said first and second data-compressed video signals;

frame formatting means for converting the output signal of the data compression encoder means into a single frame format signal or a multiframe format signal and forwarding the output signal of said frame formatting means to the communication channel;

frame deformatting means for decomposing a video signal supplied from the communication channel into constituent frames;

a second selection means for receiving a second command signal from the communication channel;

data decompression decoder means for decompressing the constituent frames and supplying the decomposed frames to a display means if the second control signal corresponds to frames having full-size frame format; and means, responsive to said second selection means, for converting the decompressed frames into an integrated frame format signal if the second control signal corresponds to frames having smaller-than-full-size frame format, and applying the integrated frame format signal to the display means.

16. A video teleconferencing user terminal according to claim 15, further comprising:

a determining means for supplying format information for video signals output by said user terminal, wherein said frame formatting means, responsive to said determining means, outputs the single frame format signal on the multiframe format signal according to the supplied format information.

* * * * *